US009823371B2

(12) United States Patent
Long

(10) Patent No.: US 9,823,371 B2
(45) Date of Patent: Nov. 21, 2017

(54) METHODS AND SYSTEMS FOR TOWING ACOUSTIC SOURCE SUB-ARRAYS

(71) Applicant: PGS Geophysical AS, Oslo (NO)

(72) Inventor: Andrew Samuel Long, South Perth (AU)

(73) Assignee: PGS Geophysical AS, Oslo (NO)

( * ) Notice: Subject to any disclaimer, the term of this patent is extended or adjusted under 35 U.S.C. 154(b) by 387 days.

(21) Appl. No.: 14/572,882

(22) Filed: Dec. 17, 2014

(65) Prior Publication Data

US 2016/0061981 A1    Mar. 3, 2016

Related U.S. Application Data

(60) Provisional application No. 62/044,561, filed on Sep. 2, 2014.

(51) Int. Cl.
*G01V 1/38* (2006.01)
*G01V 1/20* (2006.01)
*B63B 21/66* (2006.01)

(52) U.S. Cl.
CPC ............ *G01V 1/3817* (2013.01); *G01V 1/201* (2013.01); *B63B 21/66* (2013.01)

(58) Field of Classification Search
CPC ....... G01V 1/201; G01V 1/3817; B63B 21/66
See application file for complete search history.

(56) References Cited

U.S. PATENT DOCUMENTS

| 3,577,946 | A | * | 5/1971 | Horton | B63B 21/502 |
| | | | | | 114/265 |
| 4,130,078 | A | | 12/1978 | Cholet | |
| 4,660,184 | A | * | 4/1987 | Haukjem | G01V 1/38 |
| | | | | | 114/61.2 |
| 4,721,180 | A | | 1/1988 | Haughland et al. | |
| 7,463,549 | B2 | | 12/2008 | Naess | |
| 8,570,829 | B2 | | 10/2013 | Hovland et al. | |
| 8,654,605 | B2 | | 2/2014 | Paull et al. | |
| 9,372,274 | B2 | * | 6/2016 | Kim | G01V 1/3808 |
| 2013/0088937 | A1 | * | 4/2013 | Sykes | G01V 1/3826 |
| | | | | | 367/16 |
| 2014/0230709 | A1 | | 8/2014 | Reynolds, Jr. | |

FOREIGN PATENT DOCUMENTS

CN    201707446    1/2011

OTHER PUBLICATIONS

European Patent Application No. 15183273.0, Extended Search Report, dated Apr. 25, 2016.

* cited by examiner

*Primary Examiner* — Krystine Breier

(57) ABSTRACT

Acoustic source arrays and related methods. At least some of the example embodiments are methods including towing a first source sub-array comprising a first surface float, the first surface float defines a first connection point at a proximal end of the first surface float. The method may further include towing a second source sub-array comprising a second surface float, the second surface float defines a second connection point at a proximal end of the second surface float. And during the towing of the first and second source sub-arrays, the method may include maintaining a lateral separation between the first and second connection points of the first and second surface floats by a first strut, the first strut coupled between the first connection point of the first surface float and the second connection point of the second surface float.

20 Claims, 9 Drawing Sheets

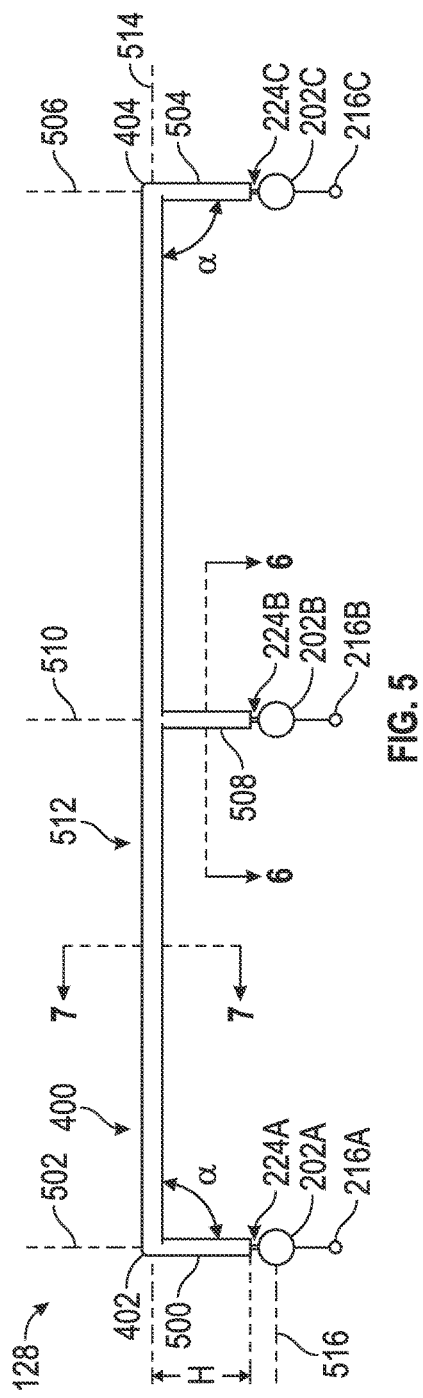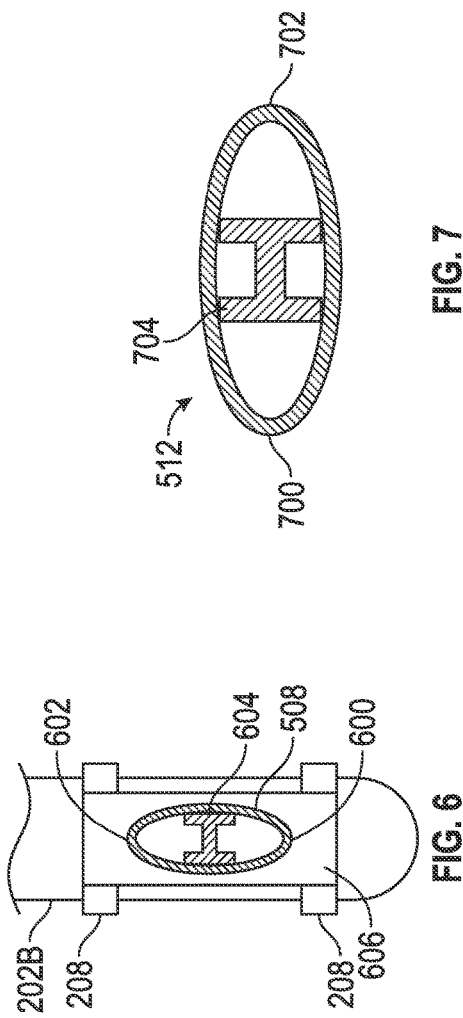

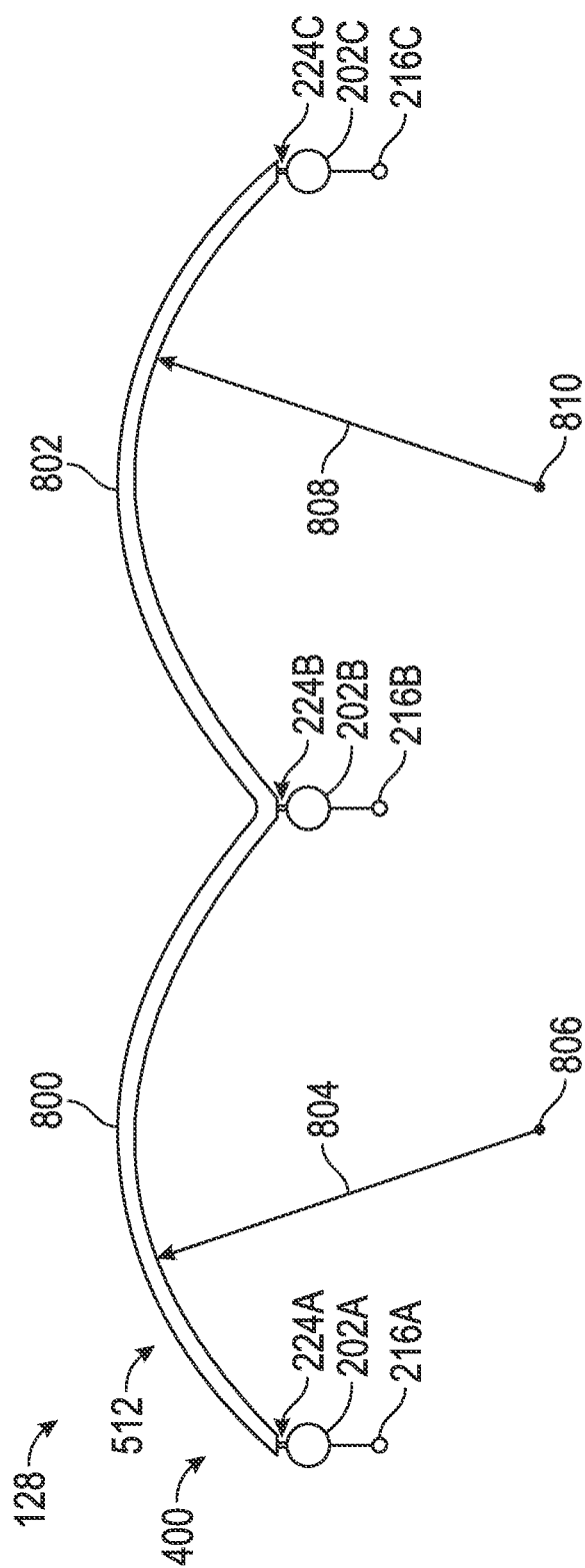

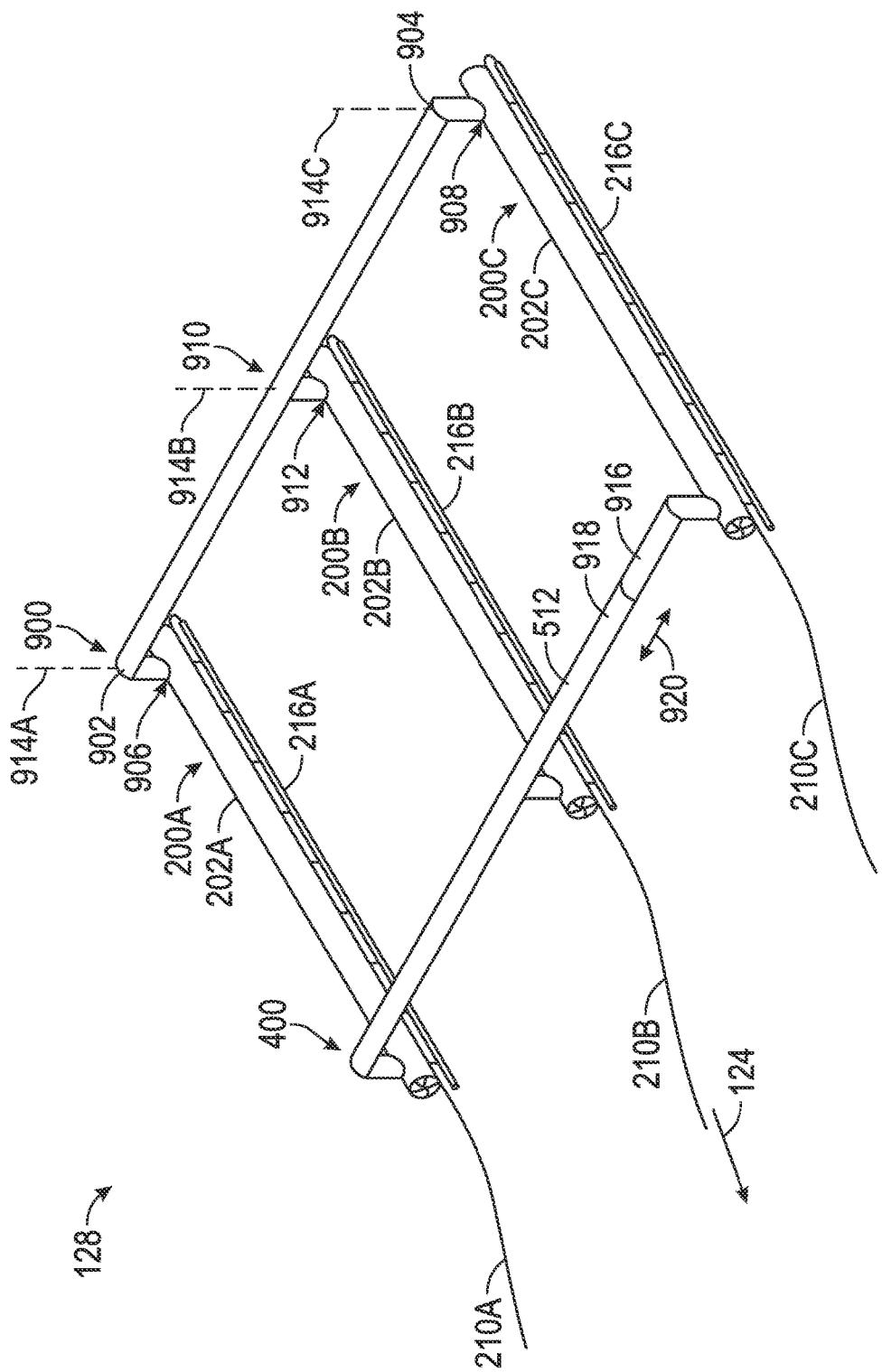

METHODS AND SYSTEMS FOR TOWING ACOUSTIC SOURCE SUB-ARRAYS

CROSS-REFERENCE TO RELATED APPLICATIONS

This application claims the benefit of U.S. Provisional Application Ser. No. 62/044,561 filed Sep. 2, 2014 and titled "An Articulated Strut Connection for Source Sub-Arrays". The provisional application is incorporated by reference herein as if reproduced in full below.

BACKGROUND

Marine seismic surveys may use an acoustic source array made up of two or more free-floating source sub-arrays acting in concert. In particular, each sub-array may comprise a surface float towed along the top of water, with the surface float supporting a plurality of geophysical energy sources (such as air guns, marine vibrators, electric bipole antennae, or magnetic coils) suspended in the water from the surface float. Various combinations of ropes and paravanes may be used to attempt to hold the sub-arrays in a predetermined orientation relative to the other sub-array(s). However, changing and unpredictable ocean currents, as well as surface winds, make holding the sub-arrays in the correct orientation difficult. Not only does the quality of the source signal diminish when the sub-arrays are out of orientation, but also damage can occur to the sub-arrays if they contact each other while deployed.

BRIEF DESCRIPTION OF THE DRAWINGS

For a detailed description of exemplary embodiments, reference will now be made to the accompanying drawings which are not necessarily to scale.

FIG. 5 shows a front elevation view of an acoustic source array in accordance with at least some embodiments;

FIG. 6 shows a cross-sectional view taken substantially along line 6-6 of FIG. 5;

FIG. 7 shows a cross-sectional view taken substantially along line 7-7 of FIG. 5;

FIG. 8 shows a front elevation view of an acoustic source array in accordance with at least some embodiments;

FIG. 9 shows a perspective view of an acoustic source array in accordance with at least some embodiments;

DEFINITIONS

Certain terms are used throughout the following description and claims to refer to particular system components. As one skilled in the art will appreciate, different companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

"Cable" shall mean a flexible, tension carrying member that also comprises electrical conductors and/or optical conductors for carrying electrical power and/or signals between components.

"Rope" shall mean a flexible, tension carrying member that does not include electrical and/or optical conductors. Such a rope may be made from fiber, steel, other high strength material, chain, or combinations of such materials.

"Line" shall mean either a rope or a cable.

"Strut" shall mean a device or system which resists longitudinal compression. A line, or any portion thereof, shall not be considered a strut.

"Surface float" shall mean a flotation device that resides at the surface of the water during use. Temporary submersion caused by wave action shall not obviate the status of a device as a surface float.

A device or portion of a device defining a "central axis" shall not be read to require that the central axis is an axis of symmetry, unless expressly stated.

DETAILED DESCRIPTION

The following discussion is directed to various embodiments of the invention. Although one or more of these embodiments may be preferred, the embodiments disclosed should not be interpreted, or otherwise used, as limiting the scope of the disclosure or the claims. In addition, one skilled in the art will understand that the following description has broad application, and the discussion of any embodiment is meant only to be exemplary of that embodiment, and not intended to intimate that the scope of the disclosure or the claims, is limited to that embodiment.

Various example systems are directed to an acoustic source array for use in marine geophysical surveys where the survey includes a seismic component. More particularly, the various example systems are directed to an acoustic source array made of source sub-arrays and a strut that maintains lateral spacing between the surface floats of each source sub-array. The specification first turns to an example geophysical survey system.

Figure 1:
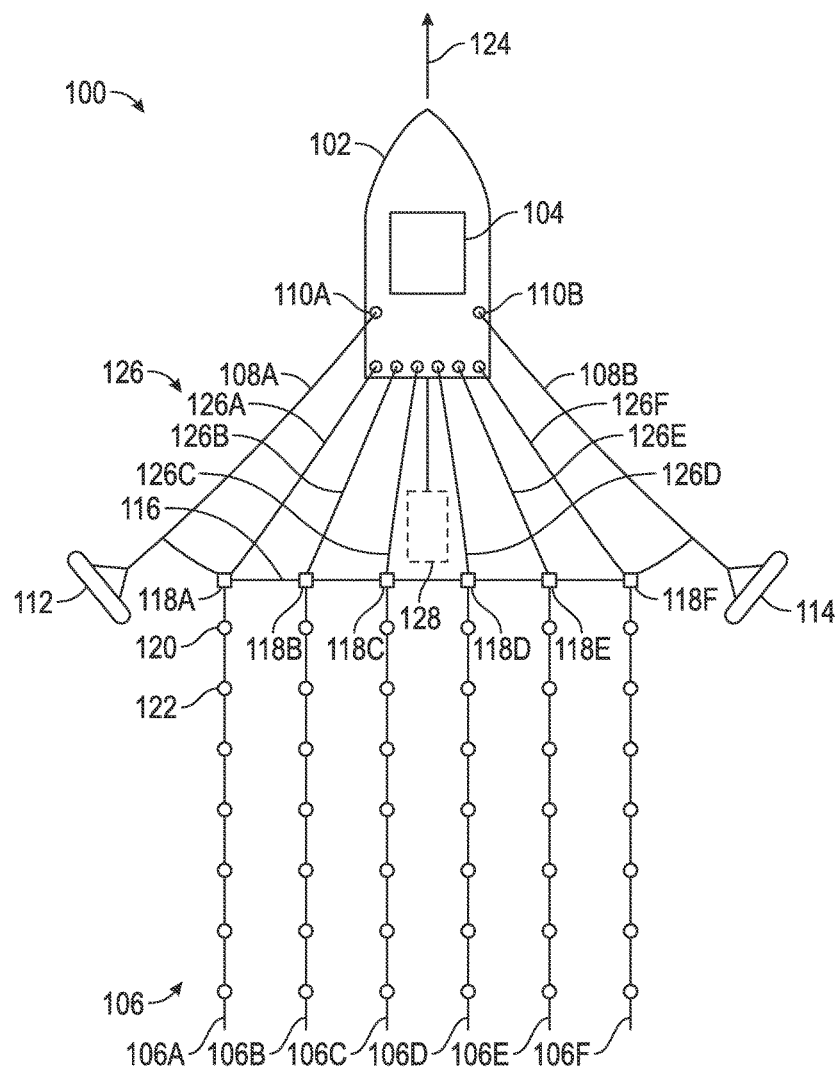
FIG. 1 shows an overhead view of a marine survey system in accordance with at least some embodiments.

FIG. 1 shows an overhead view of a marine survey system 100 in accordance with at least some embodiments. In particular, FIG. 1 shows a survey or tow vessel 102 having onboard equipment 104, such as navigation, energy source control, and data recording equipment. Tow vessel 102 is configured to tow one or more sensor streamers 106 through the water. While FIG. 1 illustratively shows six sensor streamers 106A-F, any number of sensor streamers 106 may be used.

In the example system, the sensor streamers 106 are coupled to towing equipment that maintains the sensor streamers 106 at selected depth and lateral positions with respect to each other and with respect to the survey vessel 102. The towing equipment may comprise paravane tow lines 108 (as shown, two paravane tow lines 108A and 108B) each coupled to the tow vessel 102 by way of respective winches 110 (as shown, two winches 110A and 110B). The respective winches enable changing the deployed length of each paravane tow line 108. The distal end of paravane tow line 108A is coupled to a paravane 112, and the distal end of paravane tow line 108B is coupled to paravane 114. In each case, the tow lines 108A and 108B couple to their respective paravanes through respective sets of lines called a "bridle". The paravanes 112 and 114 are each configured to provide a lateral force component to the various elements of the survey system when the paravanes are towed in the water. The combined lateral forces of the paravanes 112 and 114 separate the paravanes from each other until the paravanes put one or more spreader lines 116, coupled between the paravanes 112 and 114, into tension.

As illustrated, the sensor streamers 106 are each coupled, at the ends nearest the tow vessel 102 (i.e., the proximal ends), to a respective lead-in cable termination 118. The lead-in cable terminations 118 (as shown, six such cable terminations labeled 118A-F) are coupled to or are associated with the spreader lines 116 so as to control the lateral positions of the streamers 106 with respect to each other and with respect to the tow vessel 102. Electrical and/or optical connections between the appropriate components in the onboard equipment 104 and the sensors (e.g., 120, 122) in the sensor streamers 106 may be made using inner lead-in cables 126 (as shown, six such inner lead in cables labeled 126A-F). Much like the paravane tow lines 108 associated with respective winches 110, each of the inner lead-in cables 126 may be deployed by a respective winch or similar spooling device such that the deployed length of each inner lead-in cable 126 can be changed. The illustrated towing equipment may be used alone or in conjunction with other lateral position and depth control equipment. Other example systems may have more complex or simpler towing arrangements.

Each sensor streamer 106 may comprise an elongated outer jacket defining an interior volume. The elongated outer jacket defines a central axis along the long dimension of the sensor streamer. In the example situation of FIG. 1, the central axis of each sensor streamer is parallel to the direction of travel of the tow vessel 102, the direction of travel indicated by arrow 124. The sensors (e.g., 120, 122) may reside within the interior volume or on the elongated outer jacket, and the sensors may be longitudinally spaced along each sensor streamer 106. In some embodiments, the sensors 120, 122 are geophones which are sensitive to minute changes in velocity. The geophones may be suspended in a gimbal arrangement such that each geophone is most sensitive to vertical velocity changes (i.e., velocity changes aligned with the force of gravity). In other embodiments, the sensors 120, 122 are hydrophones which are highly sensitive to acoustic energy. In yet still other cases, the sensors 120, 122 may include one or any combination of the following: geophones; hydrophones; accelerometers, solid-state motion sensors (MEMS), multiple component geophones, orientation sensors, and electromagnetic sensors.

Still referring to FIG. 1, in some situations the tow vessel 102, in addition to towing the sensor streamers 106, may also tow the acoustic source array 128 (shown in dashed lines in FIG. 1 so as not to further complicate the figure, but discussed in greater detail below). While FIG. 1 shows the acoustic source array 128 towed by the same vessel that tows the sensor streamers 106, in other example cases a separate vessel may tow the acoustic source array 128. Moreover, in alternative systems the sensor streamers 106 may be permanently or semi-permanently placed on the sea floor as ocean bottom cables, and thus need not be towed in conjunction with the acoustic source array. Further still, in some situations multiple acoustic source arrays 128 may be towed (e.g., two acoustic source arrays towed respectively between the two inner-most sensor streamers 106, or towed outside the two inner-most streamers). In yet still other cases, multiple acoustic source arrays may be towed outside the sensor streamers.

Figure 2:
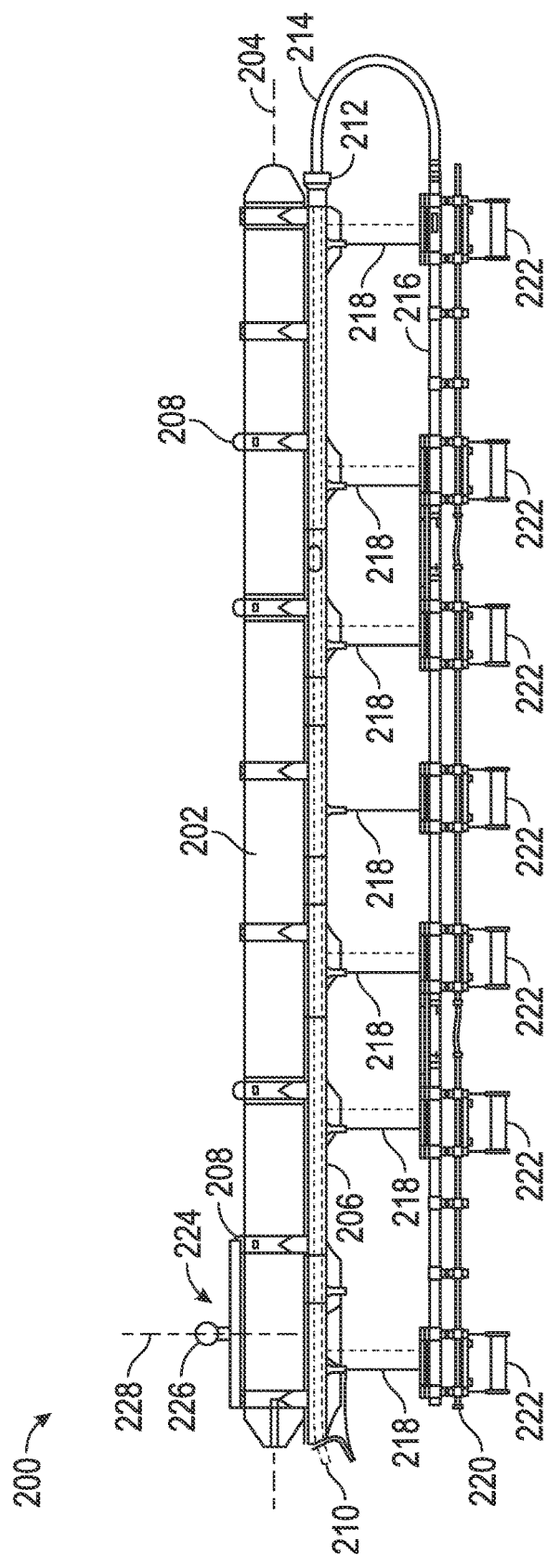
FIG. 2 shows a side elevation view of a sub-array in accordance with at least some embodiments.

FIG. 2 shows a side elevation view of a source sub-array 200 (hereafter just sub-array 200) in accordance with example systems. As will be discussed more below, two or more sub-arrays 200 may be combined to create an acoustic source array. The example sub-array 200 comprises a surface float 202 that defines a central axis 204. The example surface float 202 may be made of any suitable material, such as plastic or light weight metallic material. The inside of the surface float 202 may be hollow, or filled with a foam material, such the surface float 202 supports the weight of the remaining portions of the sub-array 200 yet floats at the water's surface during use. The example surface float 202 includes a keel 206 which may be coupled to the surface float 202 using band clamps 208 or similar devices. The sub-array 200 couples the tow vessel 102 (not shown) by way of an umbilical cable 210 coupled to the front (proximal end) and aft (distal end) of the keel 206. The aft end of the umbilical cable 210 couples to a termination 212 comprising a metallic (e.g., steel) housing with connectors for electric and optical signals, and a connector for air pressure. The cables and hoses connected to the termination 212 form a tail loop 214, which then extends forward under the surface of the water. A harness pipe 216 may be suspended at a selected depth in the water below the surface float 202, with the harness pipe held at the selected depth by lines or ropes 218. The harness pipe 216 also supports an air manifold 220. The air manifold 220 may be suspended from the harness pipe 216 using clamps (not specifically numbered in FIG. 2). A plurality of geophysical energy sources, such as air guns 222, are suspended below the surface float 202, and more particularly are suspended below the harness pipe 216 and air manifold 220 by lines (not specifically numbered). In the case of air guns 222, air pressure from the umbilical cable 210 is fed into the air manifold 220, and each air gun 222 is supplied though air outlets defined in the air manifold 220. Electrical signals, or other signals, are distributed to and from the air guns 222. Air guns 222 are used as an example in this specification, with the understanding that other types of geophysical energy sources can be used instead of or in addition to air guns 222, including marine vibrators, electric bipole antennae, and magnetic coils.

The sub-array 200 further comprises a connection point 224, illustratively shown as a ball 226 of a ball joint, the connection point 224 defined at the proximal end of the surface float 202. Further example connections points 224 are discussed more below. The connection point 224 defines a central or rotational axis 228 that is perpendicular to (and thus passes through) the central axis 204 of the surface float 202. The surface float 202 may rotate about or "weathervane" around the rotational axis 228 when the sub-array 200 is coupled to other sub-arrays by a strut.

Figure 3:
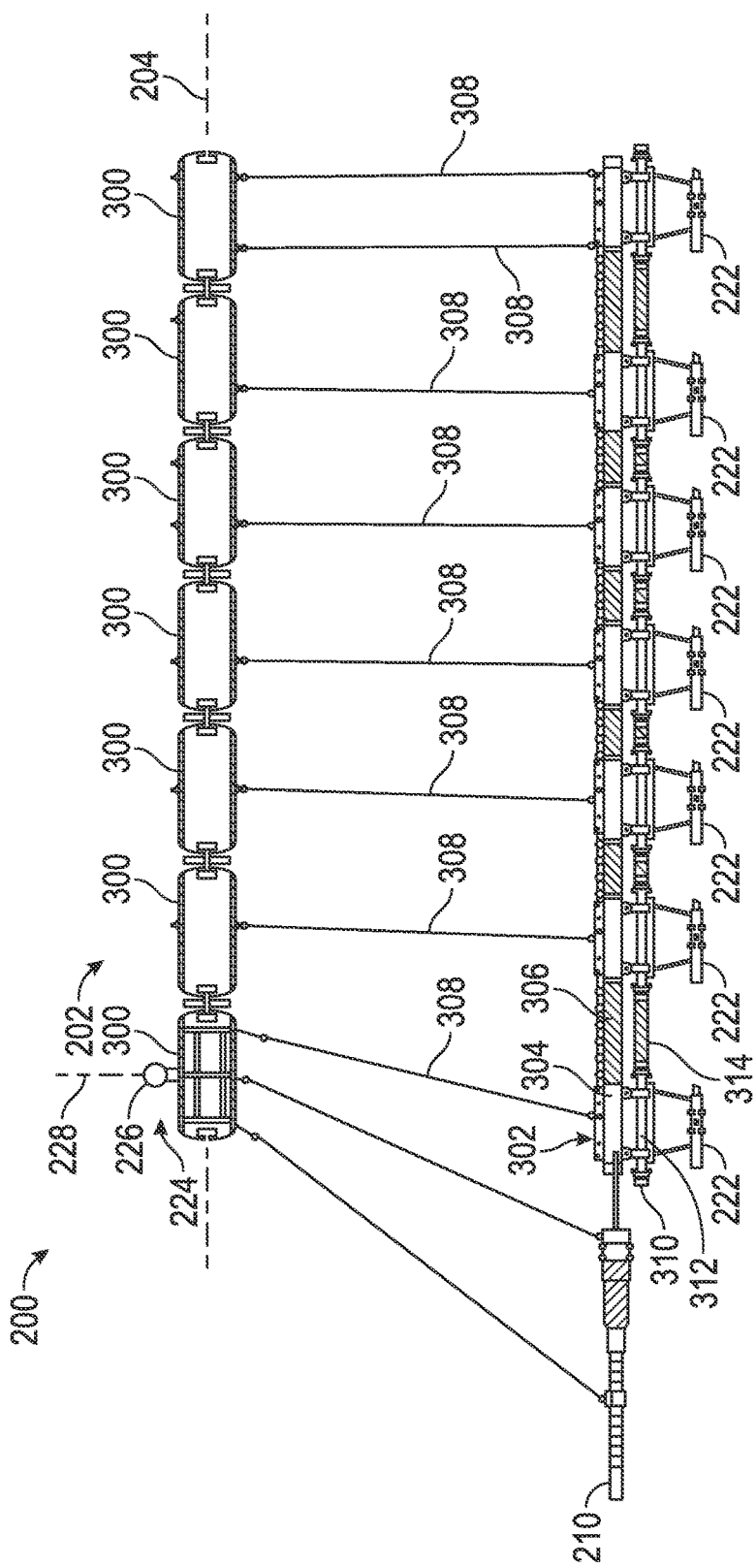
FIG. 3 shows a side elevation view of a sub-array in accordance with at least some embodiments.

FIG. 3 shows a side elevation view of an alternative sub-array 200 that may be used. In particular, the sub-array 200 of FIG. 3 likewise defines a surface float 202, but in the example case of FIG. 3 the surface float 202 is made of a plurality of float segments 300, and in the figure seven such float segments 300 are shown. The surface float 202 of FIG. 3 likewise defines the central axis 204. Each of the float segments 300 may be made of any suitable material, such as plastic or light weight metallic material. The inside of each float segment 300 may be hollow, or filled with a foam material, such that the surface float 202 as a whole supports the weight of the remaining portions of the sub-array 200 yet floats at the water's surface during use. The umbilical cable 210 is connected to a forward most portion of a harness pipe 302 (the harness pipe comprising solid sections 304 and flexible sections 306). The harness pipe 302 may be suspended at a selected depth in the water by lines or ropes 308 coupled to associated float segments. An air manifold 310 (comprising both solid sections 312 and flexible sections 314) is suspended below the harness pipe 302. A plurality of air guns 222 are suspended below the surface float 202, and more particularly are suspend from the air manifold 310. Air pressure from the umbilical cable 210 is fed into air manifold 310 and each air gun 222 is supplied though air outlets defined in the air manifold 310. Here again, the use of air guns 222 is merely an example in this specification, with the understanding that other types of geophysical energy sources can be used instead of or in addition to air guns 222, including marine vibrators, electric bipole antennae, and magnetic coils.

Much like the sub-array 200 of FIG. 2, the sub-array 200 of FIG. 3 further comprises a connection point 224, illustratively shown as a ball 226 of a ball and socket joint, the connection point 224 defined at the proximal end of the surface float 202. The connection point 224 defines a central or rotational axis 228 that is perpendicular to the central axis 204 of the surface float 202. The surface float 202 may rotate about or "weathervane" around the rotational axis 228 when the sub-array 200 is coupled to other sub-arrays by a strut.

In practice, two or more sub-arrays are used together to create an overall acoustic source array 128 (FIG. 1). In the related-art, the individual sub-arrays are held in position by a system of ropes and paravanes similar to that discussed with the respect to the sensor streamers 106 in FIG. 1. In particular, in the related-art a set of paravanes is used to tension a rope. Each sub-array 200 is coupled to the rope and thus the lateral spacing between the sub-arrays (i.e., the distance between the surface floats measured perpendicularly to the direction of travel of the tow vessel during straight line travel) is maintained by tension in the rope. However, changing and unpredictable ocean currents, as well as surface winds, make holding the sub-arrays in correct orientation difficult. In certain situations tension in the rope may not be sufficient to hold the sub-arrays in correct orientation, and the rope between the sub-arrays does not resist longitudinal compression.

Figure 4:
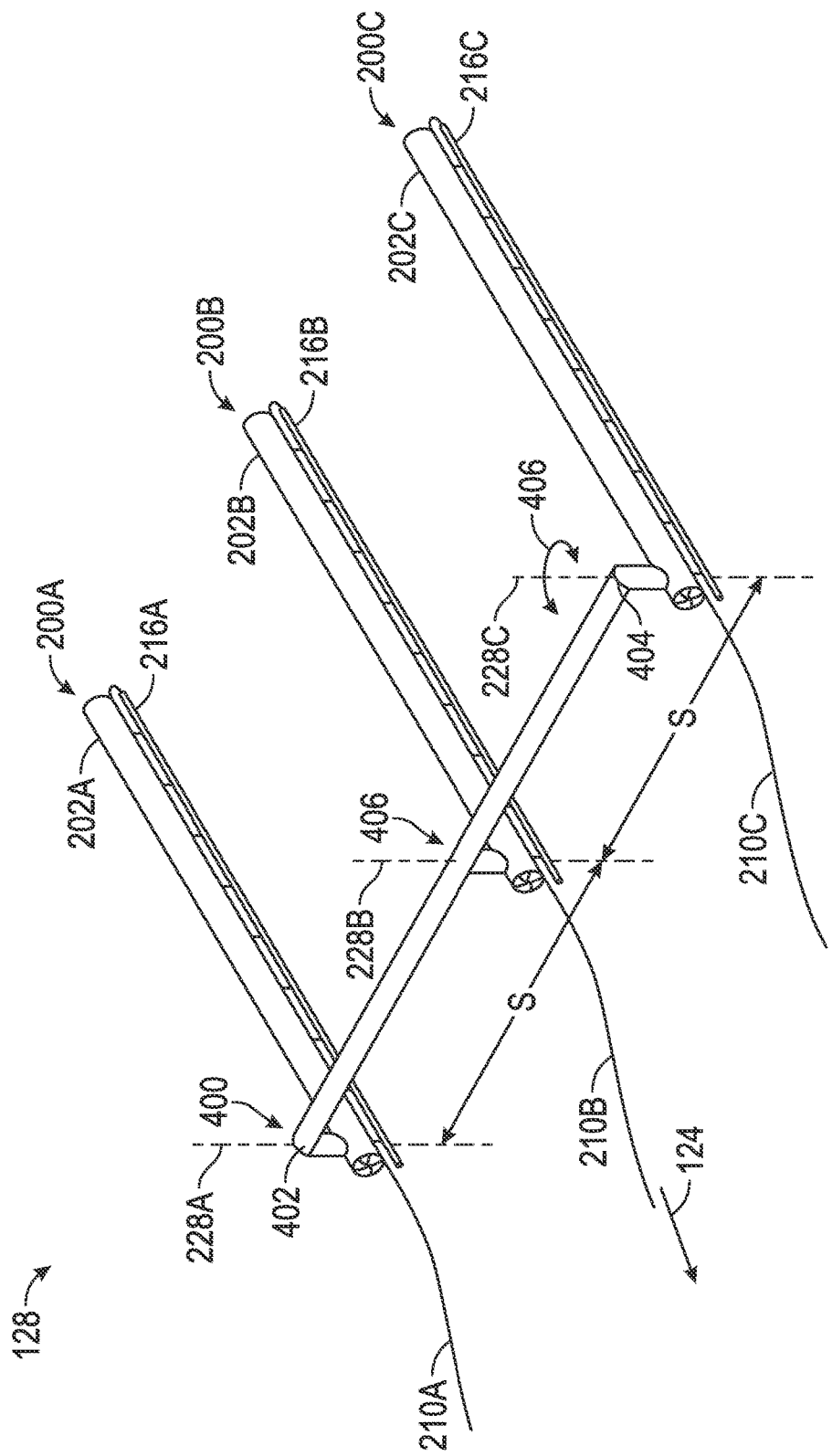
FIG. 4 shows a perspective view of an acoustic source array in accordance with at least some embodiments.

In order to at least partially overcome the shortcomings of related-art, the various example systems are directed to a source array comprising sub-arrays and a strut that maintains lateral spacing between the surface floats of each source sub-array. FIG. 4 shows a perspective view of an acoustic source array 128 in accordance with example systems. In particular, FIG. 4 shows three sub-arrays 200A-C. Visible for each sub-array is the surface float 202A-C, the harness pipe 216A-C, and ropes. The ropes are not specifically numbered, and other components of the sub-arrays are not shown so as not to unduly complicate the figure. The example system of FIG. 4 uses sub-arrays as described with respect to FIG. 2; however, the further explanation is equally applicable to sub-arrays as described with respect to FIG. 3.

FIG. 4 further shows a strut 400. The strut 400 defines a first end 402 and a second end 404 opposite the first end 402. The strut 400 couples on the first end 402 to the proximal end surface float 202A. Example coupling mechanisms are discussed in greater detail below. The strut 400 couples on the second end 404 to the proximal end of the surface float 202C. Some example acoustic source arrays 128 use two sub-arrays, however, the example acoustic source array 128 of FIG. 4 uses three sub-arrays, and thus sub-array 200B resides between sub-array 200A and sub-array 200C. It follows that the strut 400 couples to the proximal end of the surface float 202B at a medial portion 406 of the strut 400.

Also shown in FIG. 4 are the umbilical cables 210A-C for each sub-array 200A-C, respectively. In accordance with the example systems shown, each sub-array is towed by its respective umbilical cable. However, the strut 400 is a rigid structure that resists longitudinal compression (e.g., resists forces tending to bring the proximal ends of the surface floats 202A-C together). Likewise, the strut 400, being a rigid structure, also resists longitudinal tension (e.g., resists forces tending to separate the proximal ends of the surface floats 202A-C). Thus, the strut 400 maintains lateral separation S between the respective sub-arrays 202A-C, and more particularly between the connection points. In some systems the lateral separation is measured perpendicularly to the direction of travel of the tow vessel (as shown by arrow 124) during straight line travel of the tow vessel. The strut maintains a lateral separation S of between and including 6 to 15 meters (m), and in some cases between and including 6 to 8 m. That is, a particular strut may be designed and constructed to maintain a predetermined lateral separation (e.g., 6 meters) throughout an entire geophysical survey. In most cases, the lateral separation S will be uniform for an overall acoustic source array 128, but such uniform lateral separation is not required.

As discussed with respect to the example sub-arrays, each connection point defines a rotational axis, and the rotational axes are shown in FIG. 4 as rotational axes 228A-C. Each example connection point is designed and constructed to enable rotation of the proximal end of the respective surface float 202A-C about the respective rotational axis 228A-C. Thus, while the strut 400 maintains the lateral separation between the connection points, the connection points maintain the lateral separation while enabling the surface floats 202A-C to rotate or "weathervane" about their respective rotational axis 228A-C, as shown by double-headed arrow 408 associated with rotational axis 228C. Enabling the surface floats 202A-C to rotate about their respective rotational axis 228A-C addresses several design and operational considerations. For example, the rotational freedom between the surface floats and strut 400 reduces the amount of torque load that the strut 400 may need to carry during use, which reduces the size and weight of the strut. Moreover, the rotational freedom between the surface floats and strut 400 accounts for the realities of towing in marine environments with large waves, enabling relative position of the sub-arrays 200 along the tow direction 124 to change as wave fronts impinge on the acoustic source array at various angles.

FIG. 5 shows a front elevation view of the acoustic source array 128 of FIG. 4. In particular, visible in FIG. 5 is the strut 400, the surface floats 202A-C, the harness pipes 216A-C, and ropes. Again, the ropes are not specifically numbered, and other components of the sub-arrays not shown, so as not to unduly complicate the figure. The strut 400 defines a stanchion 500 disposed at the first end 402 of the strut, the stanchion 500 coupled to the surface float 202A at the connection point 224A. The stanchion 500 defines a central axis 502 (which in some cases is coaxial with the rotational axis 228A). The strut 400 further defines a stanchion 504 disposed at the second end 404 of the strut, the stanchion 504 coupled to the example surface float 202C at the connection point 224C. The stanchion 504 defines a central axis 506 (which in some cases is coaxial with the rotational axis 228C). Again, acoustic source arrays may comprise only two sub-arrays, but in the example system the acoustic source array 128 uses three sub-arrays, and thus in the example system strut 400 defines a stanchion 508 medially disposed on the strut, the stanchion 508 coupled to the example surface float 202B at the connection point 224B. The stanchion 508 defines a central axis 510 (which in some cases is coaxial with the rotational axis 228B).

The strut 400 further comprises a crossbar portion 512. The crossbar portion 512 couples to the stanchion 500, stanchion 504, and stanchion 508, and thus spans the distance between the outer stanchions 500 and 504. In some example systems, and as shown, the central axis 514 of the crossbar portion 512 is perpendicular to the central axes 502, 506, and 510 of the stanchions 500, 504, and 508, respectively. However, the perpendicular relationship is not required, particularly for the outer stanchions 500 and 504, and thus the inside angle $\alpha$ between the central axis 514 of the crossbar portion 512 and the central axis of any stanchion may be between and including 45 and 135 angular degrees. In some embodiments, a greater or lesser angle can be used. That is, a particular strut may be designed and constructed to have a particular angle between the central axis 512 of the crossbar portion and the central axis of a selected stanchion (e.g., 100 angular degrees) throughout an entire geophysical survey. In most cases, the angles between the central axis 512 of the crossbar portion and the central axis of the outer stanchions will be the same, but such is not strictly required.

In example systems the surface floats 202 are sized to account for the various devices suspended thereunder and which are supported by the buoyancy of the surface floats 202. Thus, in use the water level, such as example water level 516, has an elevation that is approximately medially disposed on the cross-section of the surface floats in calm seas. However, marine geophysical surveys may be performed in a variety of weather conditions and sea states. In heavy seas, the surface floats, or portions thereof, may temporarily submerge as waves pass the surface floats. In example systems, the strut 400 is provided with stanchions 500, 504, and 508 to elevate the crossbar portion 512 such that, in most cases, the surface waves will not encounter or break over the crossbar portion 512. Thus, the stanchions 500, 504, and 508 define a height H (measured between connection point to the underlying surface float and the central axis 514 of the crossbar portion 512) of between and including 1 to 5 m, and in many cases 1 to 2 m. In some embodiments, the height can be longer or shorter. In this way, as the surface floats temporarily submerge as caused by passing waves, in many cases only the stanchions encounter the wave, though for larger waves the crossbar portion 512 to may be struck.

While the cross-sectional shape of the stanchions may take any suitable form (e.g., square, rectangular, round, rectangular with a rounded leading edge, symmetric air foil), in example systems the cross-sectional shape of the stanchions may be oval to increase mechanical strength and to reduce the drag induced in the system caused by waves breaking around the stanchions in heavy seas. In particular, FIG. 6 shows a cross-sectional view of stanchion 508 (representative of all the stanchions in the example system of FIG. 5) taken substantially along line 6-6 of FIG. 5. As shown in FIG. 6, the example stanchion 508 defines an oval cross-sectional shape with at least one, but in most cases two axes of symmetry. In some embodiments, the cross-sectional shape is asymmetrical. Thus, the example stanchion 508 defines a rounded leading edge 600 and a rounded trailing edge 602. The example stanchion 508 may be made from any suitable material. For example, the exterior surface may be a metallic material (e.g., aluminum), and in such cases the metallic material may provide sufficient structural rigidity to support the various forces applied without an internal support structure. Thus, in such embodiments, the internal volume of the stanchion may be hollow. In other cases, however, the expected forces to be carried by the stanchion may be carried by an internal support structure within the internal volume defined by the stanchion, the internal structure illustratively shown as an I-beam 604 (but any suitable internal support structure may be used). In cases where an internal support structure is provided, the metallic material that defines the exterior surface may be thinner, or alternative materials (e.g., plastic, fiber glass) may be used.

Also visible in FIG. 6 is the proximal portion of the surface float 202B, along with a plate member 606 upon which the various components of the connection point may be mounted. The plate member 606 may be held in place by band clamps 208 which also hold the keel (not visible in FIG. 6) in place. Dedicated band clamps for the plate member 606 may be alternatively used.

Returning again to FIG. 5, if the sea state in which an acoustic source array 128 is to be used is limited to low to medium wave-height seas, or the height H of the stanchions is relatively large, waves may not or only rarely break over the crossbar portion 512. Thus, in such circumstances the crossbar portion 512 may have a shape that is not particularly hydrodynamic. For example, the crossbar portion 512 may be an exposed I-beam that spans the distance between the outermost stanchions 500, or the crossbar portion 512 may define a square or rectangular cross-sectional shape with or without an internal support structure. However, for acoustic source arrays 128 designed to be used in heavy seas, or for strut 400 where the height H of the stanchions is short relative to the expected wave heights (or both), the crossbar portion 512 may likewise have cross-sectional shape that is hydrodynamically advantageous for those situations where a significant number of waves break over the crossbar portion 512 in heavy seas.

FIG. 7 shows a cross-sectional view of the crossbar potion 512 taken substantially along line 7-7 of FIG. 5. As shown in FIG. 7, the example crossbar portion 512 defines a cross-sectional shape of an oval with at least one, and as shown two, axes of symmetry. In some embodiments, the cross-sectional shape is asymmetrical. Thus, the crossbar portion 512 defines a rounded leading edge 700 and a rounded trailing edge 702. The example crossbar portion may be made from any suitable material. For example, the exterior surface may be a metallic material (e.g., aluminum), and in such cases the metallic material may provide sufficient structural rigidity to support the various forces applied without an internal support structure. Thus, in such embodiments, the internal volume of the crossbar portion may be hollow. In other cases, however, the expected forces to be carried by the crossbar portion may be carried by an internal support structure within the internal volume defined by the crossbar portion, the internal structure illustratively shown as an I-beam 704 (but any suitable internal support structure may be used). In cases where an internal support structure is provided, the metallic material that defines the exterior surface may be thinner, or alternative materials (e.g., plastic, fiber glass) may be used. The specification now turns to an alternate strut.

FIG. 8 shows a front elevation view of an acoustic source array 128 in accordance with other example systems. In particular, visible in FIG. 8 is the strut 400, the surface floats 202A-C, the harness pipes 216A-C, and ropes. Again, the ropes are not specifically numbered, and other components of the sub-arrays not shown, so as not to unduly complicate the figure. The strut 400 of FIG. 8 has a crossbar portion 512, however, the crossbar portion 512 may be conceptually divided into a first arc portion 800 and a second arc portion 802. The first arc portion 800 couples to the surface float 202A at connection point 224A, and couples to the surface float 202B at connection point 224B. Arc portion 800 arches upward away from the connection points. Likewise, the second arc portion 802 couples to the surface float 202B at connection point 224B, and couples to the surface float 202C at connection point 224C. Similarly, arc portion 802 arches upward away from the connection points. Having a strut 400 with arc portions 800 and 802 serves a similar purpose to the stanchions as discussed with respect to FIG. 5. In particular, the arc portions 800 and 802 raise the apex of the crossbar portion above the surface of the water to reduce the surface area against which waves break around and/or over during use of the acoustic source array.

The types of connection points 224 used in the embodiments of FIG. 8 may be the same as used for the embodiments of FIG. 5, and again example connection points are discussed below. Likewise, the distance between the surface floats 202 may be in the same ranges as discussed with the respect to the embodiments shown in FIG. 5. In the example systems, the arc portion 800 defines a radius of curvature 804 having a center point 806. For lateral separation between the surface float 202A and the surface float 202B (in the view of FIG. 8, the distance along the plane of the page) within the ranges discussed above, and in combination with an apex height of the arc portion 800, the center point 806 for the radius of curvature 804 is below the surfaces floats 202A and 202B. Likewise, the arc portion 802 defines a radius of curvature 808 having a center point 810. For lateral separation between the surface float 202B and the surface float 202C within the ranges discussed above, and in combination with the apex height of the arc portion 802, the center point 810 for the radius of curvature 808 is below the surface floats 202B and 202C. Alternatively stated, when the acoustic source array 128 is floating in water, the center points 806 and 810 for the radii of curvature 804 and 808 are below the surface of the water.

If the sea state in which an acoustic source array 128 of FIG. 8 is to be used is limited to low wave-height seas, waves may not or only rarely break over and/or around the crossbar portion 512. Thus, in such circumstances the crossbar portion 512 may have a cross-sectional shape that is not particularly hydrodynamic (e.g., square, rectangular, round, rectangular with a rounded leading edge). In such cases, the crossbar portion 512 may also be an exposed I-beam or other mechanical structure that spans the distance between the connection points. However, for acoustic source arrays 128 designed to be used in heavy seas, or for struts 400 where radius of curvature is long and thus the height of the apex of each arc portion 800 and 802 is low relative to the expected wave heights (or both), the crossbar portion 512 may likewise have cross-sectional shape that is hydrodynamically advantageous. For example, the cross-sectional shape of the strut 400 may define a cross-sectional shape of an oval with at least one axis of symmetry, and thus defining a rounded leading edge and a rounded trailing edge. In some embodiments, a strut 400 (FIG. 4) can be combined with arc portions 800 and 802, such that the strut 400 extends downward from the ends of each arc portion 800 and 802. The same material and structural considerations discussed with the respect to the example systems of FIG. 5 are equally applicable to the strut 400 of FIG. 8, and so as not to unduly lengthen the specification will not be reproduced again here.

The strut 400 maintains the lateral separation between the proximal ends of the sub-arrays 200. As discussed, the surface floats 202 of the sub-arrays 200 may weathervane around their rotational axes 228. In spite of the presence of the strut 400, it may be possible for the trailing or distal ends of the surface floats 202 to get out of the parallel orientation, and in fact the distal ends may contact each other in certain situations (e.g., during periods of time when towing has stopped). In order to at least partially overcome these shortcomings, alternate systems utilize a second or back strut that maintains lateral spacing between the distal ends of the surface floats. FIG. 9 shows a perspective view of an acoustic source array 128 in accordance with further example systems. In particular, FIG. 9 shows three sub-arrays 200A-C. Visible for each sub-array is the surface float 202A-C, the harness pipe 216A-C, and ropes. The ropes are not specifically numbered, and other components of the sub-arrays not shown, so as not to unduly complicate the figure. Thus, the example system of FIG. 9 uses sub-arrays as described with respect to FIG. 2; however, the further explanation is equally applicable to sub-arrays as described with respect to FIG. 3. FIG. 9 further shows strut 400 at the proximal end of the surface floats 202.

FIG. 9 further shows a back strut 900. The back strut 900 defines a first end 902 and a second end 904 opposite the first end 902. The back strut 900 couples on the first end 902 to the distal end surface float 202A, and more particularly couples at connection point 906. The back strut 900 couples on the second end 904 to the distal end of the surface float 202C, and more particularly at the connection point 908. Some example acoustic source arrays 128 use two sub-arrays, however, the example acoustic source array 128 of FIG. 9 uses three sub-arrays, and thus sub-array 200B resides between sub-array 200A and sub-array 200C. It follows that the back strut 900 couples to the distal end of the surface float 202B at a medial portion 910 of the strut 900, and more particularly couples at connection point 912.

FIG. 9 shows the umbilical cables 210A-C for each sub-array 200A-C, and in accordance with the example systems each sub-array is towed by its respective umbilical cable. Like strut 400, the back strut 900 is a rigid structure that resists longitudinal compression (e.g., resists forces tending to bring the distal ends of the surface floats 202A-C together). Likewise, the back strut 900, being a rigid structure, also resists longitudinal tension (e.g., resists forces tending to separate the distal ends of the surface floats 202A-C). Thus, the back strut 900 likewise maintains lateral separation between the distal ends of the respective sub-arrays 202A-C, and more particularly between the connections points on the distal ends of the sub-arrays 202A-C. In some systems, the lateral separation maintained by the back strut 900 is the same lateral separation S (FIG. 4) maintained by strut 400.

Each connection point at the distal ends of the sub-arrays defines a rotational axis, and the rotational axes are shown in FIG. 9 as rotational axis 914A-C. While example connections points are discussed below, each example connection point is designed and constructed to enable rotation of the proximal end of the respective surface float 202A-C about the respective rotational axis 914A-C. Thus, while the back strut 900 maintains the lateral separation between the connection points at the distal ends of the surface floats, the connections points maintain the lateral separation while enabling the surface floats 202A-C to rotate about their respective rotational axes 914A-C. Enabling the surface floats 202A-C to rotate about their respective rotational axes 914A-C addresses several design and operational considerations. For example, the rotational freedom between the surface floats and strut 900 reduces the amount of torque load that the strut 900 may need to carry during use, which reduces the size and weight of the back strut. Moreover, the rotational freedom between the surface floats and strut 900 accounts for the realities of towing in marine environments with large waves.

The back strut 900 of FIG. 9 is shown to have the same structure as the strut 400 at the proximal portions of the surface floats. The description of the stanchions, crossbar portion, dimensions, cross-sectional shapes, and internal structures are equally applicable to the back strut 900, and thus will not be repeated again here so as not to unduly lengthen the specification. In fact, the only difference between the strut 400 and the back strut 900 may be the order in which the struts are attached to the sub-arrays 200 when the acoustic source array 128 is being assembled on station. It further follows that the back strut 900 may also take the form as shown in FIG. 8. Further still, the struts need not be matched pairs, and one strut may take the form as shown in FIG. 4 while the other strut may take form as shown in FIG. 8.

Although the specification to this point has referred to the struts as rigid and thus resisting longitudinal compression and tension, the description was with respect to deployed use (e.g., as the struts are used as part of an overall acoustic source array). However, depending on a variety of factors, such as depth of the target formation beneath the sea floor, and the energy of each air gun 222, the lateral separation between the sub-arrays may be selected or selectable. In some example systems, the lateral separation between the connection points may be adjusted, such as by a crossbar portion having telescoping members. FIG. 9 shows an example of such a telescoping crossbar portion 512. In particular, the crossbar portion 512 of the strut 400 may define an outer portion 916 and an inner portion 918. The outer portion 916 may be selectively telescoped into the inner portion 918 achieve a selected lateral separation. Given the forces that are likely carried by the strut 400, the selectively telescoping nature may be an arrangement selected and implemented on the deck of a vessel on station, prior to the strut 400 being deployed by crane to the water's surface for connection to the sub-arrays. It is noted that struts with adjustable lateral separation are introduced in FIG. 9 for convenience, and such is not meant to imply any limitation to use with dual struts. Moreover, while the adjustable nature of the of the strut is shown only between the sub-arrays 202B and 202C, the adjustable strut may be implemented between any of the sub-arrays, and may be implemented on either or both of the front strut 400 of the back strut 900.

Figure 10:
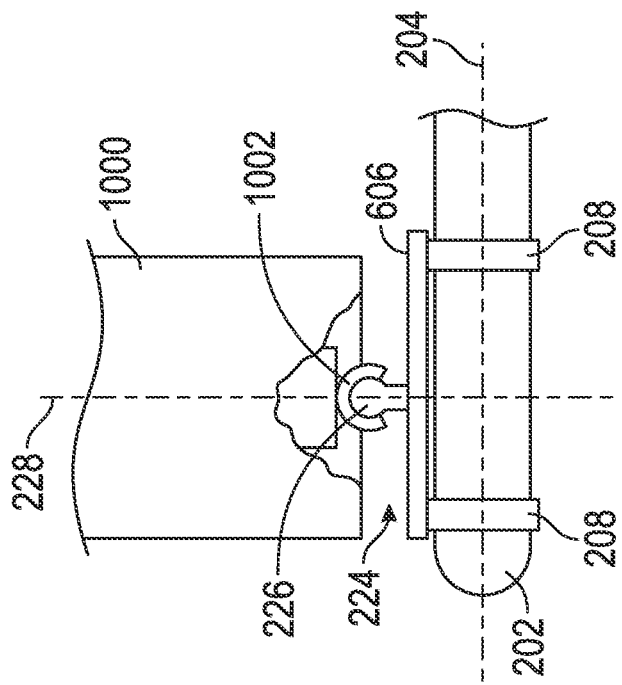
FIG. 10 shows a side elevation, partial cut-away, view in accordance with at least some embodiments.

The various connection points between the struts and the surface floats may take any suitable form, but two examples are discussed next. In particular, FIG. 10 shows a side elevation view, with partial cut-away, of an example connection point 224 in accordance with example systems. Visible in FIG. 10 is the proximal end of a surface float 202 comprising band clamps 208 supporting plate member 606. Shown in cross-section is ball 226 (of a ball and socket joint) rigidly coupled to the plate member 606. Also shown in FIG. 10 is stanchion 1000, which stanchion is illustrative of any of the previously discussed stanchions, and is also illustrative of the lower ends of the arc portions 800 and 802. The stanchion 1000 defines a socket portion 1002 (also shown in cross-section) which couples to the ball 226. The illustrative connection point 224 enables not only rotation about the rotational axis 228, but also enables the angle between the rotational axis 228 and the central axis 224 of the surface float 202 to change as well (e.g., to vary from perpendicular). The example connection point 224 is shown with the ball 226 rigidly coupled to the plate member 606, but the positions of the ball 226 and the socket portion 1002 may be reversed. In any event, the example connection point 224 maintains a fixed distance between the connection point 224 and the central axis 204 of the surface float, the fixed distance measured perpendicularly to the central axis 204.

Figure 11:
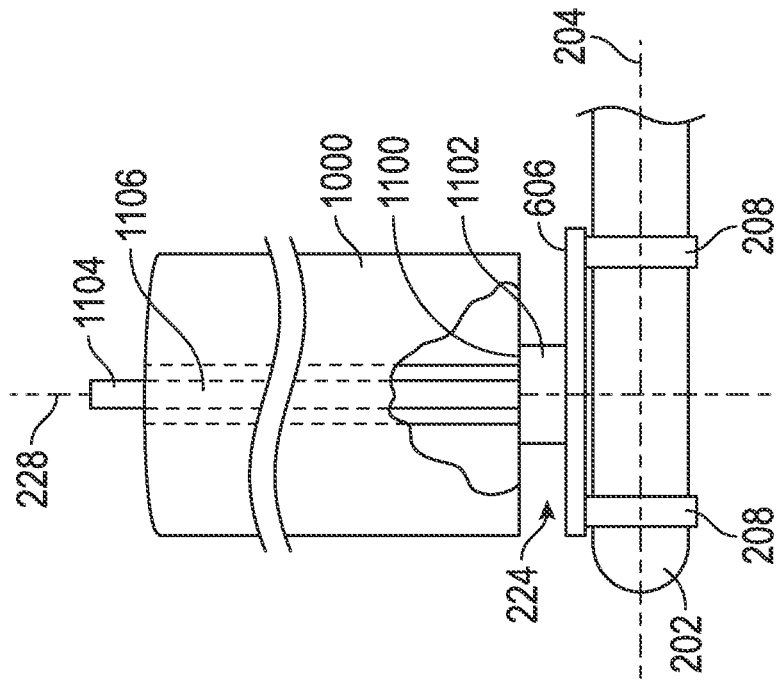
FIG. 11 shows a side elevation, partial cut-away, view in accordance with at least some embodiments.

FIG. 11 shows a side elevation view, with partial cut-away, of another example connection point 224. Visible in FIG. 11 is the proximal end of a surface float 202 comprising band clamps 208 supporting a plate member 606. Also visible is the stanchion 1000, again illustrative of all the stanchions and/or the lower portions of the arc portion 800 and 802 (FIG. 8). In this illustrative case, a bearing surface 1100 is defined by a bearing member 1102, and a pipe 1104 extends upwardly from the bearing member 1102. The bearing member 1102 and pipe 1104 are rigidly coupled to the plate member 606. The example stanchion 1000 further defines an aperture 1106 into which the pipe 1104 is telescoped. The illustrative connection point 224 of FIG. 11 thus enables rotation about the rotational axis 228, but the angle between the rotational axis 228 and the central axis 204 remains constant (and as shown, the rotational axis 228 and the central axis 204 are perpendicular). The example connection point 224 of FIG. 11 also enables distance between the connection point 224 and the central axis 204 of the surface float to change. That is, the stanchion 100 may be translated upward and downward along the rotational axis 228. Other connection points are possible.

While the connection points are discussed with respect to a front strut, the discussion regarding connection points is equally applicable to connections points with respect to a back strut.

As alluded to above, the acoustic source array 128 of the various figures is an assembly of components, including sub-arrays 200, a front strut 400, and possibly a back strut 900. It practice the acoustic source array 128 will be assembled with the tow vessel on station in the marine environment near the survey area of interested. In particular, the tow vessel or other vessel will deploy the sub-arrays 200 by a crane lifting the sub-arrays from the deck of the vessel and placing the sub-arrays into the water. Once the sub-arrays 200 are floating in the water, the crane of the vessel will lift the strut from the deck of the vessel into operational relationship with the sub-arrays 200, and a work boat will couple the strut to the proximal end of each surface float 202. If a back strut 900 is used, the tow vessel or other vessel will deploy the back strut in a similar manner, and the work boat will couple the back strut to the distal end of each surface float 202. The order of installation of the front strut 400 and the back strut 900 may be reversed.

It follows that retrieval of the acoustic source array 128 may be the deployment steps only reversed. That is, the acoustic source array 128 may be brought alongside the vessel. A strut may be connected to a crane, and thereafter the crew of the work boat releases each connection point. Once fully released, the strut is lifted by the crane and placed on the deck of the vessel. If a second strut is used, the crane may be connected to the second strut, and thereafter the crew of the work boat releases each connection point for the second strut. Once fully released, the second strut is lifted by the crane and placed on the deck of the vessel. Finally, the sub-arrays 200 may be lifted by the crane from the water and placed on the deck of the vessel.

Figure 12:
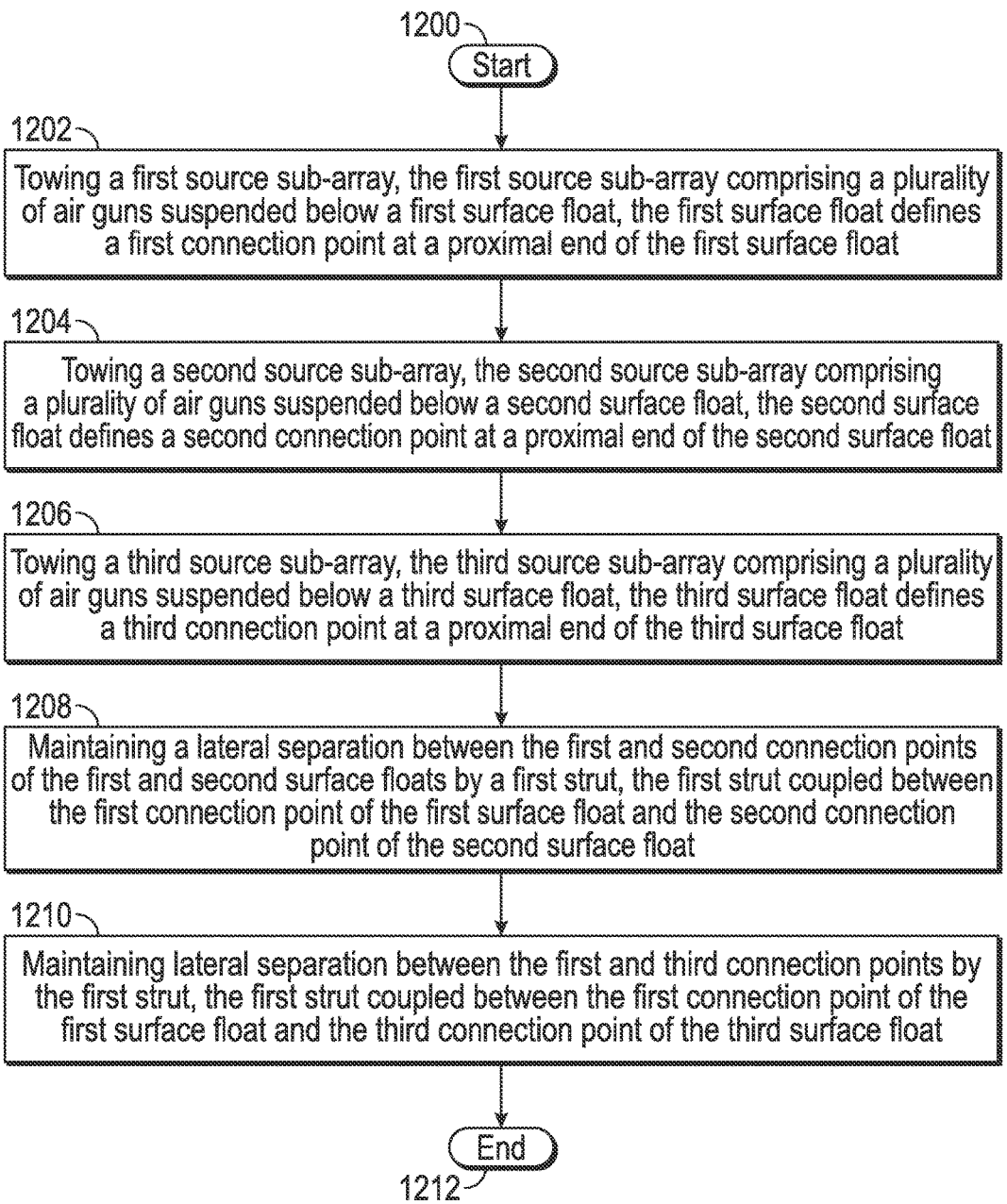
FIG. 12 shows a method in accordance with at least some embodiments.

FIG. 12 shows a method in accordance with at least some embodiments. In particular, the method starts (block 1200) and proceeds to towing a first source sub-array, the first source sub-array comprising a plurality of air guns suspended below a first surface float, the first surface float defines a first connection point at a proximal end of the first surface float (block 1202). The method further comprises towing a second source sub-array, the second source sub-array comprising a plurality of air guns suspended below a second surface float, the second surface float defines a second connection point at a proximal end of the second surface float (block 1204). Moreover, the method may comprise towing a third source sub-array, the third source sub-array comprising a plurality of air guns suspended below a third surface float, the third surface float defines third connection point at a proximal end of the third surface float (block 1206). During the towing of the first, second, and third source sub-arrays, the method comprises maintaining a lateral separation between the first and second connection points of the first and second surface floats by a first strut, the first strut coupled between the first connection point of the first surface float and the second connection point of the second surface float (block 1208). Further during the towing, the method may comprise maintaining lateral separation between the first and third connection points by the first strut, the first strut coupled between the first connection point of the first surface float and the third connection point of the third surface float (block 1210). Thereafter the method may end (block 1212).

References to "one embodiment", "an embodiment", "a particular embodiment", "some embodiments", and "example systems" indicate that a particular element or characteristic is included in at least one embodiment of the invention. Although the phrases "in one embodiment", "an embodiment", "a particular embodiment", "some embodiments", and "example systems" may appear in various places, these do not necessarily refer to the same embodiment.

The above discussion is meant to be illustrative of the principles and various embodiments of the present invention. Numerous variations and modifications will become apparent to those skilled in the art once the above disclosure is fully appreciated. While the specification discusses an acoustic source array having three sub-arrays, such is merely an example. Acoustic source arrays in conformance with the various embodiments may have as few as two, and as many as eight sub-arrays, with the strut coupling to the sub-arrays in the manner discussed above. It is intended that the following claims be interpreted to embrace all such variations and modifications.

What is claimed is:

1. A method comprising:
   towing a first source sub-array along a direction of travel, the first source sub-array comprising one or more geophysical energy sources suspended below a first surface float, the first surface float defines a first central axis that extends from the proximal end to a distal end of the first surface float along the direction of travel, and the first surface float defines a first connection point at the proximal end of the first surface float, the first connection point defines a first rotational axis that is vertical;
   towing a second source sub-array in the direction of travel, the second source sub-array comprising one or more geophysical energy sources suspended below a second surface float, the second surface float defines a second central axis that extends from a proximal end to a distal end of the second surface float along the direction of travel, and the second surface float defines a second connection point at the proximal end of the second surface float, the second connection point defines a second rotational axis that is vertical; and
   during the towing of the first and second source sub-arrays
   maintaining a lateral separation between the first and second connection points of the first and second surface floats by a first strut, the first strut coupled between the first connection point of the first surface float and the second connection point of the second surface float.

2. A method comprising:
   towing a first source sub-array, the first source sub-array comprising one or more geophysical energy sources suspended below a first surface float, the first surface float defines a first connection point at a proximal end of the first surface float, and the first surface float defines a third connection point at a distal end of the first surface float;
   towing a second source sub-array, the second source sub-array comprising one or more geophysical energy sources suspended below a second surface float, the second surface float defines a second connection point at a proximal end of the second surface float, and the second surface float defines a fourth connection point at a distal end of the second surface float; and during the towing of the first and second source sub-arrays
   maintaining a lateral separation between the first and second connection points of the first and second surface floats by a first strut, the first strut coupled between the first connection point of the first surface float and the second connection point of the second surface float; and
   maintaining lateral separation between the third and fourth connection points of the first and second surface floats by a second strut, the second strut coupled between the third connection point of the first surface float and the fourth connection point of the second surface float.

3. The method of claim 1 wherein:
   the first rotational axis perpendicular to the first central axis;
   the second rotational axis perpendicular to the second central axis; and
   wherein maintaining further comprises maintaining the lateral separation while allowing the first and second surface floats to rotate about their respective first and second rotational axis.

4. The method of claim 1 wherein:
   and wherein the method further comprises:
   maintaining a first fixed distance between the first connection point and the first central axis, the first fixed distance measured perpendicularly to the first central axis; and
   maintaining a second fixed distance between the second connection point and the second central axis, the second fixed distance measured perpendicularly to the second central axis.

5. The method of claim 1 further comprising:
   towing a third source sub-array, the third source sub-array comprising one or more geophysical energy sources suspended below a third surface float, the third surface float defines third connection point at a proximal end of the third surface float; and during the towing of the first, second, and third source sub-arrays
maintaining lateral separation between the first and third connection points by the first strut, the first strut coupled between the first connection point of the first surface float and the third connection point of the third surface float.

6. An acoustic source array comprising:
a first source sub-array, the first source sub-array comprising;
   a first surface float that defines a proximal end, a distal end, and a first central axis that extends from the proximal end to the distal end;
   a first connection point at the proximal end of the first surface float, the first connection point defines a rotational axis that is vertical;
   one or more geophysical energy sources suspended below the first surface float;
a second source sub-array, the second source sub-array comprising:
   a second surface float that defines a proximal end, a distal end, and a second central axis that extends from the proximal end to the distal end of the second surface float;
   a second connection point at the proximal end of the second surface float, the second connection point defines a rotational axis that is vertical;
   one or more geophysical energy sources suspended below the second surface float; and
a first strut that defines a first end and a second end opposite the first end, the first strut coupled on the first end to the first connection point of the first surface float, and the first strut coupled on the second end to the second connection point of the second surface float, the first and second surface floats configured to rotate about their respective first and second rotational axis relative to the first strut.

7. The acoustic source array of claim 6 wherein the strut further comprises:
   a first stanchion disposed at the first end of the strut;
   a second stanchion disposed at the second end of the strut; and
   a crossbar portion that extends between the first stanchion and the second stanchion.

8. The acoustic source array of claim 7 further comprising:
   the first stanchion defines a first stanchion central axis;
   the second stanchion defines a second stanchion central axis;
   the crossbar portion defines a crossbar central axis; and
   wherein an inside angle between the first stanchion central axis and the crossbar central axis is between and including 45 and 135 angular degrees.

9. The acoustic source array of claim 7 further comprising:
   the first stanchion defines a first stanchion central axis;
   the second stanchion defines a second stanchion central axis;
   the crossbar portion defines a crossbar central axis; and
   the first stanchion central axis is perpendicular to the crossbar central axis; and
   the second stanchion central axis is perpendicular to the crossbar central axis.

10. The acoustic source array of claim 7 further comprising:
   the first stanchion has a cross-sectional shape of an oval with at least one axis of symmetry; and
   the second stanchion has a cross-sectional shape of an oval with at least one axis of symmetry.

11. The acoustic source array of claim 10 wherein the crossbar has a cross-sectional shape of an oval with at least one axis of symmetry.

12. An acoustic source array comprising:
   a first source sub-array the first source sub-array comprising a first surface float that defines a proximal end and a distal end, and one or more geophysical energy sources suspended below the first surface float;
   a second source sub-array, the second source sub-array comprising a second surface float that defines a proximal end and a distal end, and one or more geophysical energy sources suspended below the second surface float;
   a first strut that defines a first stanchion on a first end, a second stanchion on a second end opposite the first end, and a crossbar portion that extends between the first stanchion and the second stanchion;
   the first strut coupled on the first end to the proximal end of the first surface float, and the first strut coupled on the second end to the proximal end of the second surface float;
   a second strut that defines a third end and a fourth end opposite the third end, the second strut coupled on the third end to the distal end of the first surface float, and the second strut coupled on the fourth end to the distal end of the second surface float.

13. An acoustic source array comprising:
   a first source sub-array the first source sub-array comprising a first surface float that defines a proximal end, and one or more geophysical energy sources suspended below the first surface float;
   a second source sub-array, the second source sub-array comprising a second surface float that defines a proximal end, and one or more geophysical energy, sources suspended below the second surface float;
   a first strut that defines a first stanchion at a first end, a second stanchion on a second end opposite the first end, and a crossbar portion that extends between the first stanchion and the second stanchion; and
   the first strut coupled on the first end to the proximal end of the first surface float, and the first strut coupled on the second end to the proximal end of the second surface float;
   wherein the first strut defines an arc with a radius of curvature having a center point below the first and second surface floats.

14. The acoustic source array of claim 13 wherein the first strut has a cross-sectional shape of an oval with at least one axis of symmetry.

15. The acoustic source array of claim 6 wherein a distance between the proximal end of the first surface float and the proximal end of the second surface float is at least one distance selected from the group consisting of: between and including 6 to 15 meters; and between and including 8 to 10 meters.

16. The acoustic source array as defined in claim 6 further comprising:
   a third source sub-array, the third source sub-array comprising a third surface float that defines a proximal end, and one or more geophysical energy sources suspended below the third surface float; and
   the first strut defines a medial portion, the medial portion of the first strut coupled to the proximal end of the third surface float.

17. An acoustic source array comprising:
a first source sub-array, the first source sub-array comprising a first surface float that defines a proximal end and a distal end, and one or more geophysical energy sources suspended below the first surface float;
a second source sub-array, the second source sub-array comprising a second surface float that defines a proximal end and a distal end, and one or more geophysical energy sources suspended below the second surface float;
a third source sub-array, the third source sub-array comprising a third surface float that defines a proximal end and a distal end, and one or more geophysical energy sources suspended below the third surface float;
a first strut that defines a first end, a second end opposite the first end, and a medial portion, the first strut coupled on the first end to the proximal end of the first surface float, the first strut coupled on the second end to the proximal end of the second surface float, and the first strut coupled on the medial portion to the proximal end of the third surface float;
a second strut that defines a third end and a fourth end opposite the third end, the second strut coupled on the third end to the distal end of the first surface float, and the second strut coupled on the fourth end to the distal end of the second surface float; and
the second strut defines a medial portion, the medial portion of the second strut coupled to the distal end of the third surface float.

18. The acoustic source array of claim 11 further comprising:
the first stanchion portion has a cross-sectional shape of a symmetric airfoil; and
the second stanchion portion has a cross-sectional shape of a symmetric airfoil.

19. An acoustic source array comprising:
a first source sub-array, the first source sub-array comprising a first surface float that defines a proximal end, and one or more geophysical energy sources suspended below the first surface float;
a second source sub-array, the second source sub-array comprising a second surface float that defines a proximal end, and one or more geophysical energy sources suspended below the second surface float;
a third source sub-array, the third source sub-array comprising a third surface float that defines a proximal end, and one or more geophysical energy sources suspended below the third surface float;
a first strut that defines a first end, a second end opposite the first end, and a medial portion, the first strut coupled on the first end to the proximal end of the first surface float, the first strut coupled on the second end to the proximal end of the second surface float, and the first strut coupled on the medial portion to the proximal end of the third surface float;
the first strut defines a first arc between the first surface float and the third surface float, the first arc has a first radius of curvature with a first center point below the first and third surface floats; and
the first strut defines a second arc between the second surface float and the third surface float, the second arc has a first radius of curvature with a second center point below the second and third surface floats.

20. The acoustic source array of claim 16 wherein a distance between the proximal end of the first surface float and the proximal end of the third surface float between and including 6 to 15 meters, and the distance between the proximal end of the third surface float and the proximal end of the second surface float between and including 6 to 15 meters.

* * * * *